United States Patent
Varoglu et al.

(10) Patent No.: US 10,038,987 B2
(45) Date of Patent: Jul. 31, 2018

(54) REMINDERS ACCORDING TO USED/CONNECTED/NEARBY DEVICE CAPABILITY

(71) Applicant: Apple Inc., Cupertino, CA (US)

(72) Inventors: Devrim Varoglu, San Jose, CA (US); Gencer Cili, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 14/257,754

(22) Filed: Apr. 21, 2014

(65) Prior Publication Data

US 2015/0304828 A1  Oct. 22, 2015

(51) Int. Cl.
*H04W 4/16* (2009.01)

(52) U.S. Cl.
CPC ..................... *H04W 4/16* (2013.01)

(58) Field of Classification Search
CPC ................. H04W 4/16; H04W 80/00
See application file for complete search history.

(56) References Cited

U.S. PATENT DOCUMENTS

| 8,775,533 | B2 * | 7/2014 | Hassan | H04W 12/06 |
| | | | | 709/206 |
| 9,075,911 | B2 * | 7/2015 | Mohan | G06F 11/3612 |
| 2011/0131334 | A1 * | 6/2011 | Takasu | H04W 76/02 |
| | | | | 709/227 |
| 2014/0065967 | A1 * | 3/2014 | Shen | H04W 88/04 |
| | | | | 455/41.2 |
| 2014/0135036 | A1 * | 5/2014 | Bonanni | H04W 4/023 |
| | | | | 455/456.3 |
| 2014/0376049 | A1 * | 12/2014 | Von Stein | G06F 3/1292 |
| | | | | 358/1.15 |
| 2016/0224284 | A1 * | 8/2016 | Fernandes | G06F 3/1231 |

\* cited by examiner

*Primary Examiner* — Muthuswamy Manoharan
(74) *Attorney, Agent, or Firm* — Dickinson Wright RLLP

(57) ABSTRACT

This specification discloses methods and systems for setting automatic reminders in a primary device when the services/capabilities offered by the primary device or one of the connected/nearby devices change. In a first embodiment, the method can include sending a reminder according to a service becoming available on a mobile device. For example, a user can request a mobile device to send a reminder when a reliable voice call service becomes available on the mobile device. In a second embodiment, the method can include sending a notification according to a service or capability becoming available on a nearby device. In a third embodiment, the method can include sending a notification according to a service or capability becoming available on a connected/newly used device.

20 Claims, 9 Drawing Sheets

REMINDERS ACCORDING TO USED/CONNECTED/NEARBY DEVICE CAPABILITY

FIELD

The described embodiments relate generally to methods and systems for setting automatic reminders in a primary (or used) device, and more particularly to methods and systems for setting automatic reminders in a primary (or used) device to be notified when the services/capabilities offered by the primary (or used) device or one of the connected/nearby devices change.

BACKGROUND

Mobile devices can be automatically configured to remind users according to predefined location or time. However, the users cannot set automatic reminders in a primary (or used) device to be notified when the services/capabilities offered by the primary (or used) device or one of the connected/nearby devices change. The services/capabilities offered by the devices can change as a result of mobility and a user may want to be aware of such instances through an automatic reminder. One example of such a change in services/capabilities offered by a primary (or used) device occurs when the primary (or used) device becomes capable of making a reliable voice call, after the primary (or used) device moves into a location with good coverage. One example of such a change in services/capabilities offered by a connected/nearby device occurs when a primary (or used) device becomes connected to or near a second device which supports unlimited data usage, because of either movement in the primary (or used) device or movement in the second device which supports unlimited data usage. In both examples, the user may want to aware of such a change through an automatic reminder.

Therefore, it is desirable to have methods and systems for setting automatic reminders in a primary (or used) device to be notified when the services/capabilities offered by the primary (or used) device or one of the connected/nearby devices change.

SUMMARY

This specification describes various embodiments that relate to methods and systems for setting automatic reminders in a primary device to be notified when the services/capabilities offered by the primary device or one of the connected/nearby devices change. In a first embodiment, the method can include sending a reminder according to a service becoming available on a mobile device. For example, a user can request a mobile device to send a reminder when a reliable voice call service becomes available on the mobile device. In a second embodiment, the method can include sending a notification according to a service or capability becoming available on a nearby device. For example, a user can request a mobile device to send a reminder when a physical keyboard becomes available with a nearby device. In a third embodiment, the method can include sending a notification according to a service or capability becoming available on a connected/newly used device. For example, a user can request for a reminder when a physical keyboard becomes available with a second device, which the user has recently just begun to actively use. The reminder will be sent to the second device, because the user is now actively using the second device.

In one embodiment, a method for performing an action according to a service becoming available on a mobile device is disclosed. The method includes the following steps: requesting, at the mobile device, to perform the action when the service becomes available on the mobile device, detecting that the service has become available on the mobile device, and performing, at the mobile device, the action in response to the service becoming available on the mobile device. The availability of the service is changing as a result of the mobile device's mobility. In one embodiment, the step of requesting, at the mobile device, to perform the action when the service becomes available on the mobile device includes the following steps: specifying, with a reminder application, the service, using the reminder application to register, with a cellular control software, the service, and using the cellular control software to register, with a cellular protocol stack on a modem processor, for baseband indications associated with the service. In one embodiment, the step of detecting that the service has become available on the mobile device includes the following steps: sending, with the cellular protocol stack on the modem processor, a notification when the baseband indications change, using the cellular control software to determine if the service has become available on the mobile device based on the baseband indications received, and using the cellular control software to send a notification to the reminder application in response to the cellular control software determining that the service has become available. In one embodiment, the baseband indications include one or more of the following parameters: Non-Access Stratum (NAS), Circuit Switching/Packet Switching (CS/PS), roaming, link quality, bearer rate, IP addresses, and quality of service. In one embodiment, the baseband indications associated with the service is included in a mapping stored with the cellular control software. In one embodiment, the step of using the cellular control software to determine if the service has become available on the mobile device based on the baseband indications received includes the step of making a determination that the service has become available on the mobile device only after the baseband indications have shown availability of the service for a given period of time. In one embodiment, the service is a cellular service. In one embodiment, the step of performing, at the mobile device, the action in response to the service becoming available on the mobile device includes the step of sending a reminder on the mobile device in response to the service becoming available on the mobile device. In one embodiment, the step of performing, at the mobile device, the action in response to the service becoming available on the mobile device includes the step of initiating the service on the mobile device in response to the service becoming available on the mobile device.

In one embodiment, a method for sending a notification according to a service or capability becoming available on a nearby device is disclosed. The method includes the following steps: requesting, at the mobile device, to send the notification when the service or capability becomes available on the nearby device, detecting that the service or capability has become available on the nearby device, and sending, at the mobile device, the notification in response to the service becoming available on the nearby device. In one embodiment, the step of requesting, at the mobile device, to send the notification when the service or capability becomes available on the nearby device includes the following steps: pushing, at the mobile device, a request to a reminder server, where the request indicates the service or capability requested, and pushing, at the reminder server, the request to a cloud of devices. In one embodiment, detecting that the service or capability has become available on the nearby device occurs through a peer-to-peer link. In one embodiment, the peer-to-peer link is a WiFi or Bluetooth link. In one embodiment, the method further includes presenting, at the mobile device, a reminder in response to the notification.

In one embodiment, a method for sending a notification according to a service or capability being available on a second device is disclosed. The method includes the following steps: requesting, at a primary device, to send the notification when the service or capability is available on the second device, detecting that a user is actively using the second device, detecting that the service or capability is available on the second device, and sending, at the second device, the notification in response to the service or capability being available on the second device. In one embodiment, the step of requesting, at the primary device, to send the notification when the service or capability is available on the second device includes the following steps: pushing, at the primary device, a request to a reminder server, where the request indicates the service or capability requested, and pushing, at the reminder server, the request to a cloud of devices. In one embodiment, the second device is a connected or newly used device. In one embodiment, the step of detecting that the user is actively using the second device includes the step of detecting the user physically touching or performing an action on the second device. In one embodiment, the step of detecting that the user is actively using the second device includes detecting one of the following: IO (input/output) input, touchscreen input, unlock, and fingerprint. In one embodiment, the service or capability includes one of the following: a physical keyboard, a printer, unlimited data usage, and free data sharing plan.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Figure 1:
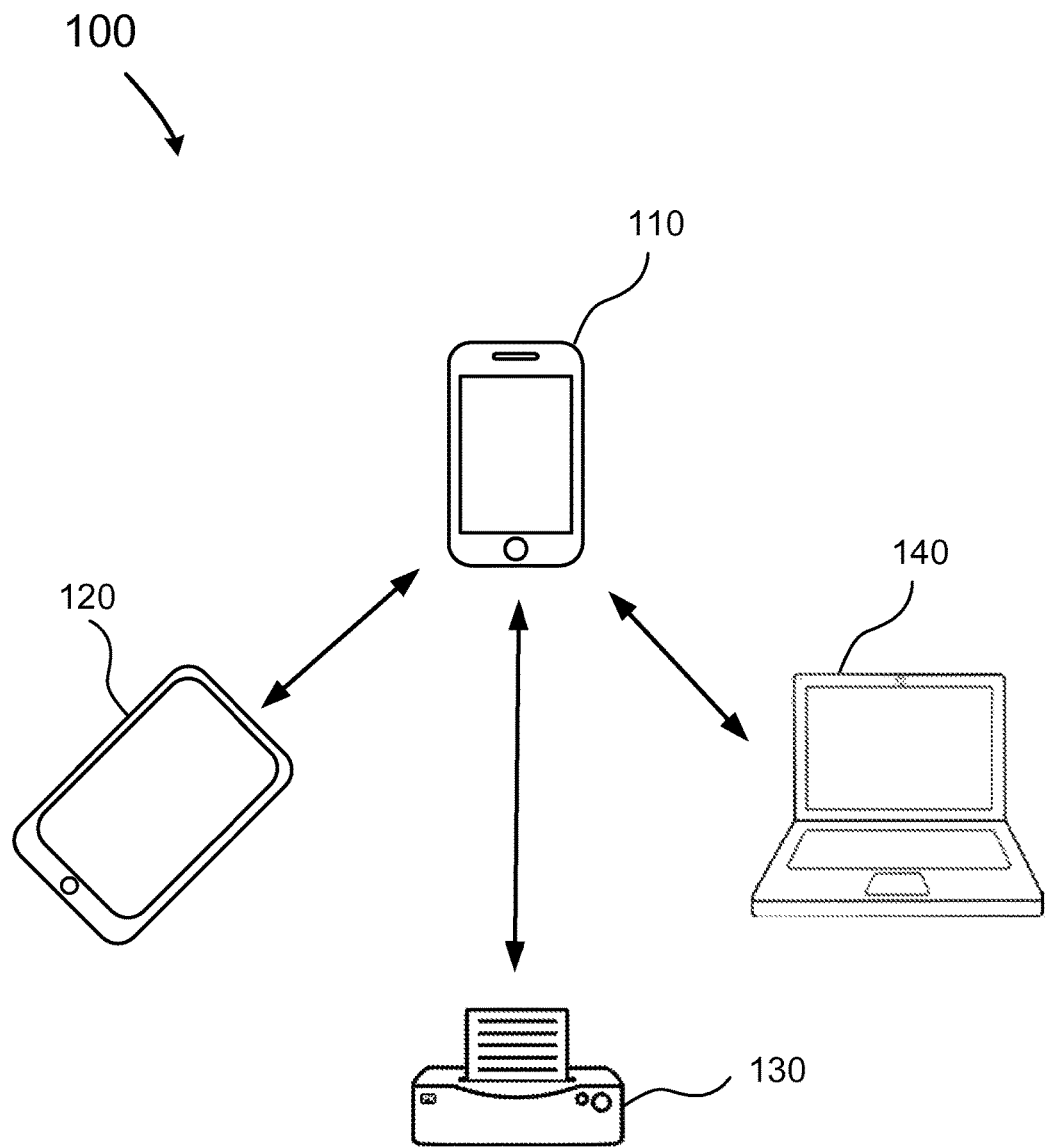
FIG. 1 shows a primary device with three connected/nearby devices, in accordance with some example embodiments.

FIG. 1 shows a primary device 110 with three connected/nearby devices (i.e., 120, 130, 140), in accordance with some example embodiments. In FIG. 1, primary device 110 is shown as a smartphone. In other embodiments, the primary device can be any mobile device, such as a handheld computing device, a mobile computer, a portable computer, a mobile phone, and a wearable computer. Other examples of a mobile device include a personal digital assistant/enterprise digital assistant, a tablet computer, an ultramobile PC, a carputer, a pen computer, a smartwatch, a smartglass, and a smart shirt. In FIG. 1, the connected/nearby devices shown include a tablet computer 120, a printer 130, and a portable computer 140. A device can be physically nearby the primary device, but not actually connected on the same network as the primary device. As an example, wireless application programming interfaces (APIs) can enable the primary device to communicate with other devices on the same local network (i.e., connected devices), and even devices which are not on a network, but are physically nearby (i.e., nearby devices). In one embodiment, APIs can be used for finding and connecting to other devices from an application on a given device. In one embodiment, an API, such as a network service discovery API, can be used for discovering available services, and a WiFi peer-to-peer (P2P) API can be used for making peer-to-peer wireless connections (where WiFi stands for wireless local area network or WLAN). In one embodiment, the primary device and the connected devices can be connected through a local area network (LAN). In other embodiments, the connection can be through a near-me area network (NAN), a personal area network (PAN), or a wide area network (WAN). In one embodiment, the connected/nearby devices can be a mobile device, such as a handheld computing device, a mobile computer, a portable computer, a mobile phone, and a wearable computer. In other embodiments, the connected/nearby devices can be a desktop computer or a peripheral device, such as a printer or a physical keyboard. FIG. 1 shows that the primary device 110 is linked with each of the three connected/nearby devices (i.e., 120, 130, 140) through a line with arrows on both ends. In one embodiment, this line with arrows on both ends represents that the primary device 110 is connected to each of the three devices (i.e., 120, 130, 140). In another embodiment, this line with arrows on both ends simply represents that the primary device 110 is nearby each of the three devices (i.e., 120, 130, 140).

Users can automatically configure mobile devices to remind the users according to predefined location or time. As further enhancements, new features and new platforms can allow mobile devices to be automatically configured for reminding the users according to changes in the capability of the used, connected, or nearby devices. In one embodiment, the mobile device can be automatically configured to remind the users when certain offered services by the primary device or the connected or nearby device change. The services and capability of the mobile device can be changing dynamically because of the mobility.

In one example scenario, a user is using a mobile smartphone as a primary device. As the user is driving around, the services/capabilities offered by the primary device is also changing. For example, the roaming service might not be offered. The mobile smartphone might be in a location with bad coverage, so a video call over cellular (such as Apples's FaceTime over cellular) is not possible. In another example, a user is just coming out of the subway, and the mobile smartphone might not be ready for some services for a few minutes. Then, when the services or capabilities of the mobile smartphone (i.e., a primary device) are changed, the user may want to aware of such instances. Specifically, the user should be given the flexibility of getting reminders so that the user is notified when the services or capabilities of the mobile smartphone (i.e., a primary device) or a connected/nearby device are changed. In one example, the user might want to be reminded when the primary device or a connected/nearby device becomes capable of data usage.

In another example, a user might have just arrived in a foreign airport and turned off the airport mode on the user's mobile smartphone, so that the mobile smartphone's signal transmitting functions are reactivated. Then it might take some time, even a few minutes, for the mobile smartphone to find the proper network to roam on and the data services to be available. During these few minutes when voice and data services are not available, the user does not want to unnecessarily attempt to browse the web or use their email. Instead, the user would like the mobile smartphone to simply send a reminder when voice and data services are available. It can save battery power, as the user does not need to be continuously turning on the display and checking for voice and data services. In this scenario, the user can set one reminder for when data service is available. The user can also set another reminder for when reliable call service is available. The mobile smartphone can determine if reliable call service is available, because the mobile smartphone already knows whether the radio frequency (RF) signal quality is good or not. This in turn allows the mobile smartphone to determine whether a voice call quality is going to be good or bad, if the user performs a voice call now.

In yet another example, a user might be driving through a bad coverage region. The user does not want to be wasting time and battery power by trying unnecessarily to make a voice call over and over again, and getting call failures and call drops. Instead of having that bad user experience of call failures and call drops, the user can set the mobile smartphone for a reminder when reliable call service is available. This can also be very useful if the user needs to make an important voice call that requires reliable call service.

However, the reminder is not limited to changes in services and capabilities for the primary (or used) device. The reminder can be extended to changes in services and capabilities for a nearby or connected device. Then, as an example, the user can further set a primary device for a reminder when the primary device is nearby or connected to another device capable of reliable voice call or video call service. Or, in another example, the user can set the connected (or newly used) device to send a reminder to the user that certain user desired services and capabilities are available when the user is connected to and using the connected (or newly used) device.

With regards to changes in services and capabilities for a nearby or connected device, it can be a service or capability that is not available for the primary device. As an example, the primary device does not provide a physical keyboard. Then the user can set a reminder for the primary device to notify the user when there is a nearby or connected device, which is a physical keyboard or has a physical keyboard. This can be helpful for the user, who has to write a long email and using a physical keyboard would make the process more efficient. In a scenario example, the user wants to write a long email, but the primary device does not have a physical keyboard. Then the user sets a reminder for when the primary device is near a physical keyboard. Later, when the user is back in the user's office, where there is device with a physical keyboard (e.g., a laptop computer) nearby, the primary device can remind the user that a physical keyboard is available nearby, so that the user can use the physical keyboard of the laptop computer to write the long email. Similarly, the user can have a need to print a document, but the primary device does not have a printer. Therefore, the user sets a reminder for when the primary device is nearby a printer. Later, when the user is nearby and connected to a printer, the primary device can remind the user that a printer is available, so that the user can use the printer to print the document. Accordingly, the user can also set reminders for other services and capabilities which are not available with the primary device. In one embodiment, these services and capabilities can include navigational or Global Positioning System (GPS) capabilities, or blood pressure measurement.

Figure 2:
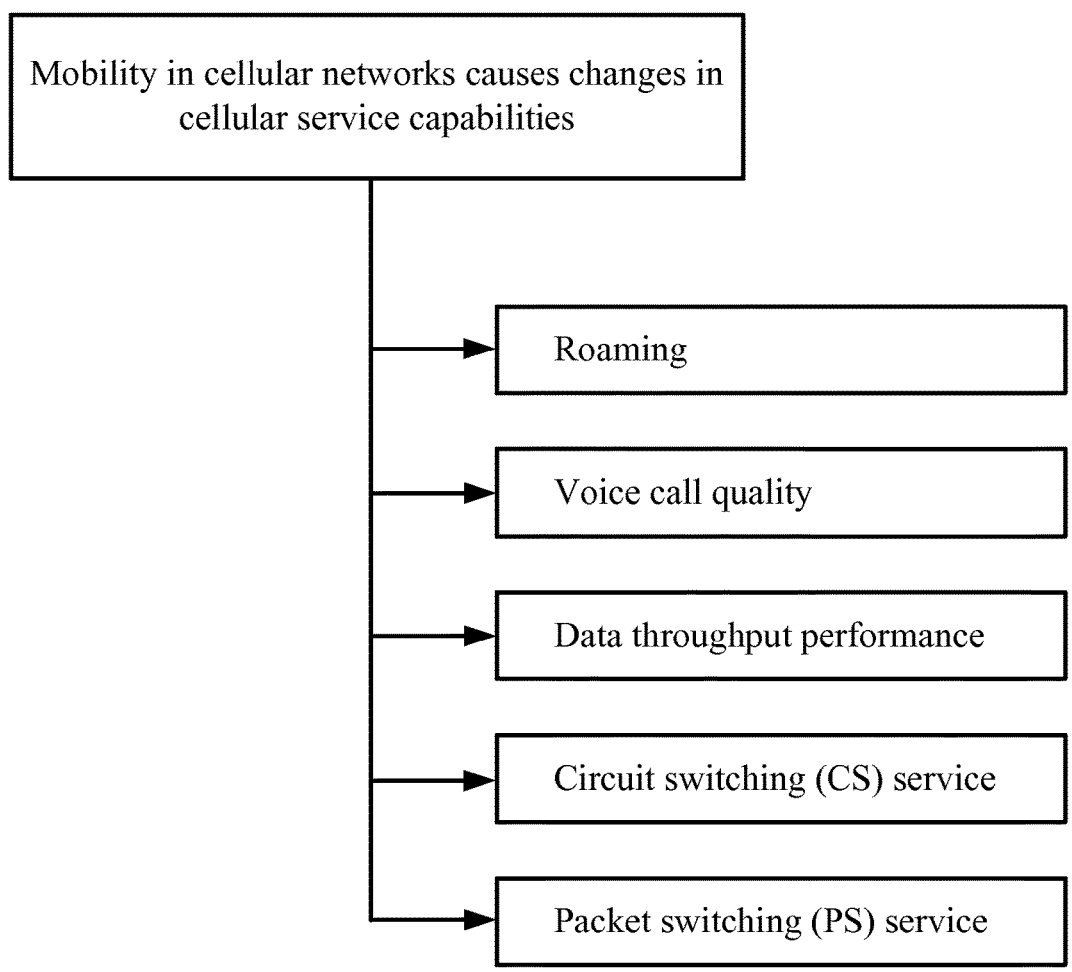
FIG. 2 shows changes in cellular service capabilities that can be caused by mobility in cellular networks, in accordance with some example embodiments.

FIG. 2 shows changes in cellular service capabilities of a mobile device that can be caused by mobility in cellular networks, in accordance with some example embodiments. These changes in cellular service capabilities can include roaming, voice call quality, data throughput performance, circuit switching (CS) service, and packet switching (PS) service. These changes in cellular service capabilities can further include internet protocol (IP) addresses and quality of service. All these factors can vary depending on a mobile device's location, so mobility of the device can result in changes in these cellular service capabilities.

A reminder application on a primary device can be used to provide reminder when the cellular services, which is offered by the primary device at a given time, change. Typically, the reminder application does not interact very much with the cellular control software on the primary device, so the reminder application does not have the flexibility to inform the user that the primary device is in an area that can sustain a good quality of service. However, the user may wish for the reminder application to have the capability to provide the reminder when the primary device is in an area that can sustain a good quality of service For example, a user may want to make a video call over cellular that does not suffer from bad user experience, such as the video quality deteriorating during the middle of the video call. In that case, the user would want to wait until the primary device reminds the user, after determining or predicting that this is a region with good quality data transmission and reception. In other words, the user may want to make a good quality video call and is willing to wait until the video call quality is good before making the video call. Therefore, the reminder application must have the capability to inform the user that the primary device is in an area that can sustain a good quality of service. In one embodiment, this can be achieved by configuring the reminder application to be communicating with the telephonic or cellular control software on the primary device. In one embodiment, the telephonic or cellular control software is a daemon running on an application processor in the primary device. In one embodiment, both the telephonic or cellular control software and the reminder application are running on the same application processor in the primary device. In one embodiment, the telephonic or cellular control software is continuously fetching information from the modem processor through the cellular protocol stack regarding the changes in baseline parameters like the received power, the link quality, and the services offered. The reminder application can register for queries for IPC (inter-process communication) notifications from the telephonic or cellular control software when certain conditions for changes in the baseline parameters (related to a particular service change) are met. Then, every time these certain conditions are met for a particular service change, the telephonic or cellular control software can send an indication to the reminder application to let the user know. This will save the user from having to continuously check over and over again if the particular service change has occurred. This will also save battery life since the user is not constantly checking for occurrence of the service change.

Figure 3:
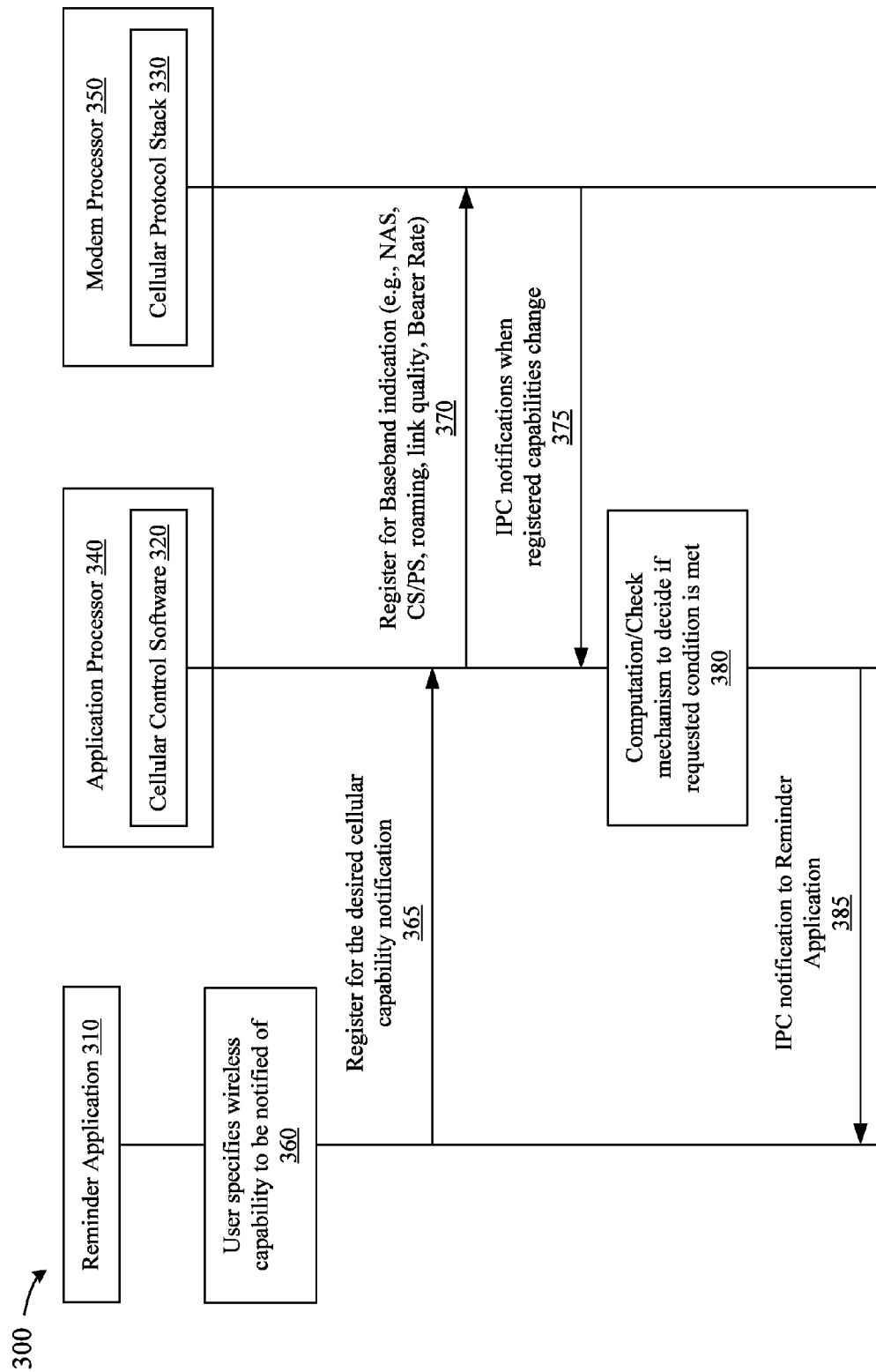
FIG. 3 shows a system for providing reminders in a primary device according to the primary device's cellular capability, in accordance with some example embodiments.

FIG. 3 shows a system 300 that can provide reminders in a primary device according to the primary device's service change, as described in the preceding paragraph. More generally, FIG. 3 shows a system 300 that can provide reminders in a primary device according to the primary device's cellular capability, in accordance with some example embodiments. In one embodiment, the entire system 300 can reside on a single primary device, such as a user equipment (UE). In FIG. 3, a Reminder Application 310 can allow a user to be reminded when the cellular services, which are offered at a given time, change according to a set of pre-defined criteria. For instance, a user can start a video call over cellular when the user is sure that the data throughput at the time will be available for a proper quality of service. The user can then set a reminder like "Remind me when I can make a good quality video call over cellular". The Reminder Application 310 can communicate the reminder request to the Cellular Control Software 320, which receives indications from the Cellular Protocol Stack 330 regarding the changes in parameters such as CS/PS services, received power, and link quality. Cellular Control Software 320 can send an indication 385 to Reminder Application 310 when the conditions change to let the user know of the change. Hence, user does not need to keep trying to set up a peer-to-peer (P2P) data call when the radio conditions are not suitable. Similar reminders can be set according to different cellular services offered. As an example, the reminder can be "Remind me when my device becomes voice call capable". FIG. 3 shows a system for providing reminders according to primary device cellular capabilities, but these reminders can also be enhanced to different wireless capabilities, such as WiFi and Bluetooth (BT).

In particular, FIG. 3 shows that a Reminder Application 310 can allow a user to specify wireless capability to be notified of in step 360. In one embodiment, this can be wireless capability that allows for a video call over cellular with a proper quality of service. In one embodiment, this can correspond to a set of pre-defined criteria that allows for a video call over cellular with a proper quality of service, such as data throughput exceeding a certain threshold. In step 365, Reminder Application 310 registers for the desired cellular capability notification with Cellular Control Software 320, which can be implemented on Application Processor 340. In step 370, Cellular Control Software 320 registers for baseband indication with Cellular Protocol Stack 330, which can be implemented on Modem Processor 350. In some embodiments, baseband indications can include Non-Access Stratum (NAS), Circuit Switching/Packet Switching (CS/PS), roaming, link quality, bearer rate, IP addresses, and quality of service. In one embodiment, the Non-Access Stratum (NAS) is a set of protocols that can be used to convey non-radio signaling between a User Equipment (UE) and the Mobility Management Entity (MME) for an LTE/E-UTRAN access (where LTE stands for Long Term Evolution, E-UTRAN stands for Evolved UMTS Terrestrial Radio Access Network, and UMTS stands for Universal Mobile Telecommunications System). The Cellular Protocol Stack 330 can monitor the baseband indication and send a notification when the registered capabilities change. In step 375, the Cellular Protocol Stack sends an inter-process communication (IPC) notification when the registered capabilities change. Then, in step 380, a computational/check mechanism, which is included in the Cellular Control Software 320, is used to decide if the requested condition is met. Next, in step 385, Cellular Control Software 320 sends an IPC notification to Reminder Application 310.

Figure 4A:
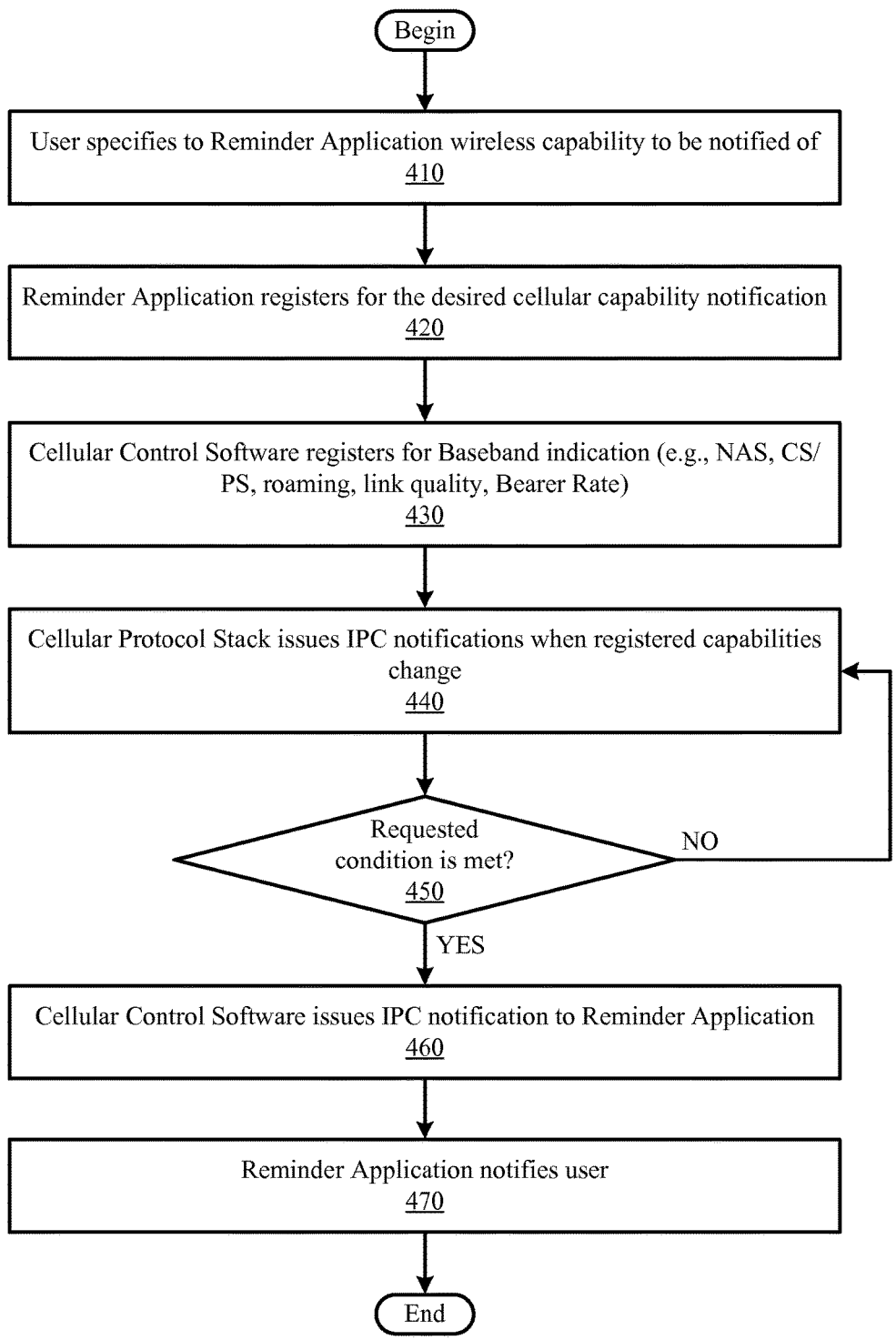
FIG. 4A shows a flow chart of method steps for providing reminders in a primary device according to the primary device's cellular capability, in accordance with some example embodiments.

FIG. 4A shows a flow chart of method steps for providing reminders in a primary device according to the primary device's cellular capability, in accordance with some example embodiments. As shown in FIG. 4A, the method 400A begins at step 410, where the user specifies to a Reminder Application wireless capability to be notified of. In one embodiment, the Reminder Application can reside on an application processor in a primary device. As an example, the wireless capability to be notified of can be when high quality video call over cellular is available for the primary device. As another example, the wireless capability to be notified of can be when voice and data services are available for the primary device. As a further example, the wireless capability to be notified of can be when reliable voice call service is available for the primary device. Then, at step 420, the Reminder Application registers for the desired cellular capability notification. In one embodiment, the Reminder Application can registers for the desired cellular capability notification with a Telephonic or Cellular Control Software residing on an application processor in the primary device. In one embodiment, the Reminder Application and the Telephonic or Cellular Control Software can be residing on the same application processor in the primary device. Next, at step 430, the Telephonic or Cellular Control Software registers for Baseband indication (e.g., NAS, CS/PS, roaming, link quality, Bearer Rate). In one embodiment, the Telephonic or Cellular Control Software registers for Baseband indication with a Cellular Protocol Stack residing on a modem processor in the primary device. After step 430, the method proceeds to step 440, where the Cellular Protocol Stack issues IPC notifications when registered capabilities change. In step 450, there is a determination if the requested condition is met. If the conditions for the registered capabilities change are not met, then the method returns to step 440, where the Cellular Protocol Stack continues to issue IPC notifications when registered capabilities change. If the conditions for the registered capabilities change are met, then the method continues to step 460, where the Cellular Control Software issues IPC notification to the Reminder Application. In subsequent step 470, the Reminder Application notifies the user of the change in the wireless capability of the primary device.

Figure 4B:
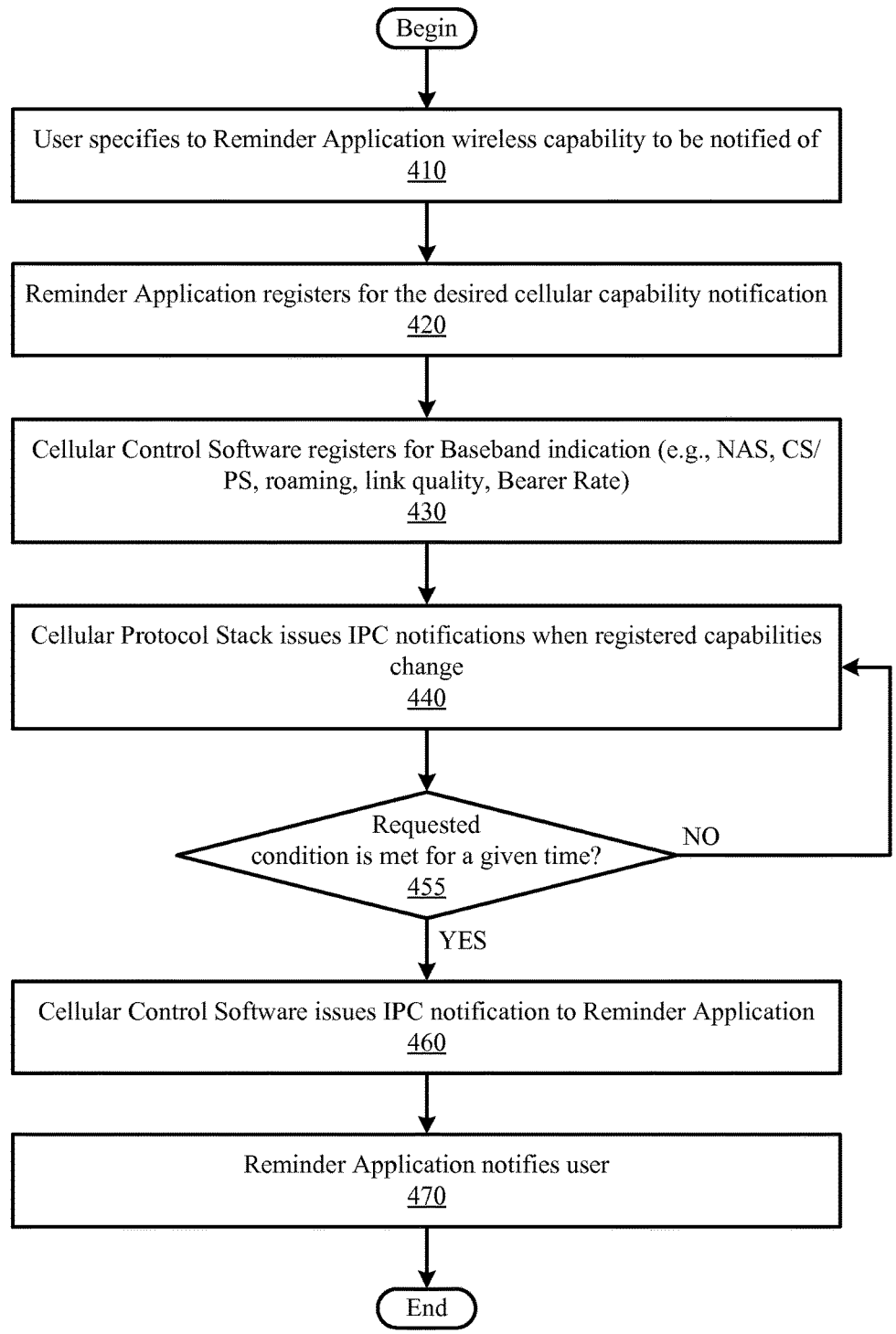
FIG. 4B shows a flow chart of method steps for providing reminders in a primary device according to the primary device's cellular capability with a built-in hysteresis for detecting the cellular capability, in accordance with some example embodiments.

In step 450 of FIG. 4A, the determination that the requested condition is met can be instantaneous. This can result in having instantaneous reminder sent to the user in step 470 of FIG. 4A. However, sending instantaneous reminders might be undesirable, since the Baseline indications registered for monitoring by the Cellular Protocol Stack are dynamic conditions which might be rapidly changing. In particular, the primary device might be rapidly drifting in and out of having the capability change. For example, the primary device might be moving near a boundary region, so that the primary device is drifting in and out of an area with reliable voice call service. Therefore, it might be desirable to send the reminder after the capability change has stabilized. As such, in one embodiment, the reminder is sent to the user only after the requested condition of step 450 has been met for a given period of time, implying that the corresponding capability change has also occurred for a given period of time. This is the embodiment shown in FIG. 4B, where step 455 determines if the requested condition is met for a given time. In one embodiment, the given time can be a single predetermined period of time (e.g., 5 seconds) for all types of capability changes. In one embodiment, the given time can be a different predetermined period of time for each type of capability changes, since some types of capability changes can require a longer or shorter stabilizing time. In summary, because the determination whether requested condition is met can be a dynamic process, the method for providing reminders in a primary device can have some kind of hysteresis built in, so the method does not result in some kind of rapidly changing reminders that reflect the rapidly changing capability of the primary device. Furthermore, it is desirable to send only one reminder reflecting the capability change (e.g., only one reminder message of "reliable voice call service is now available for the primary device"), and not a stream of reminders all reflecting the same capability change (e.g., not a stream of "reliable voice call service is now available for the primary device" messages).

Figure 5A:
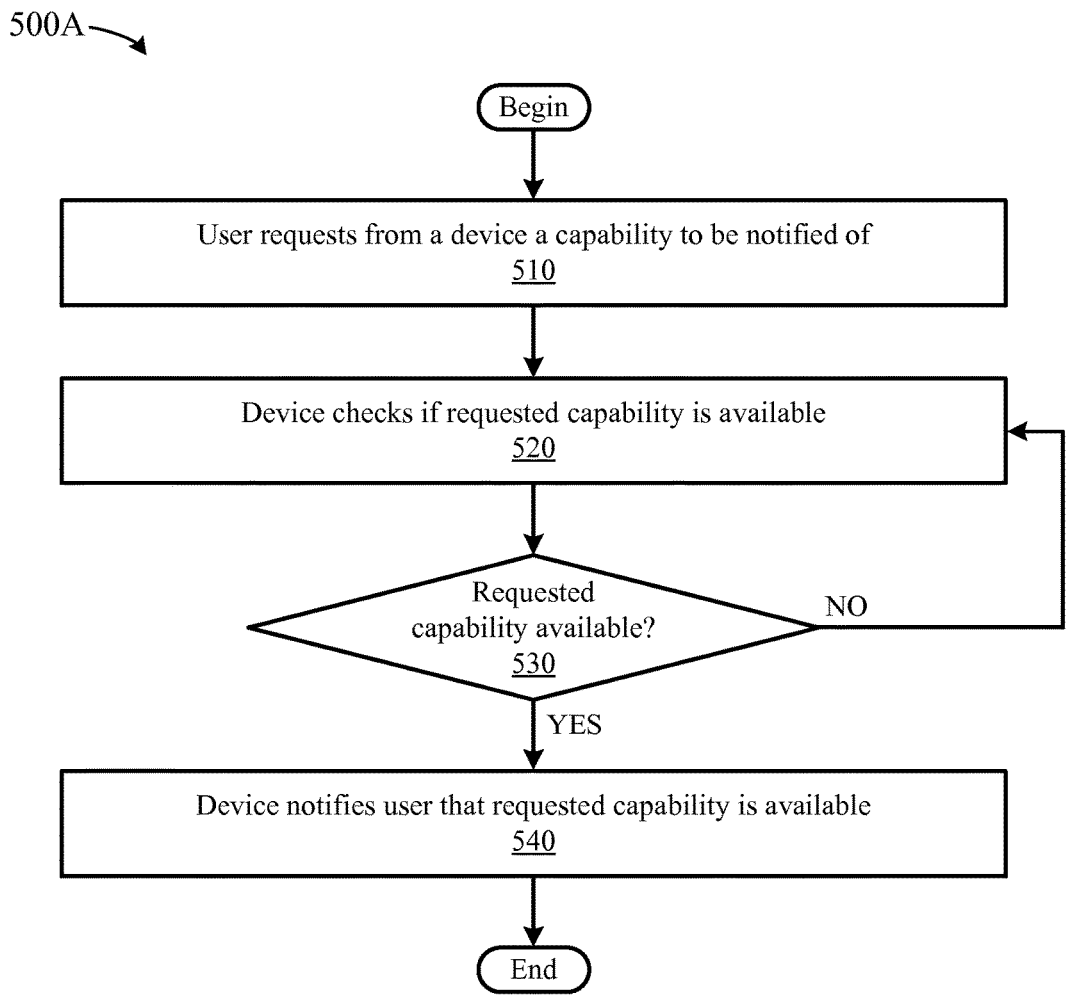
FIG. 5A shows a flow chart of method steps for providing reminders in a device according to the device's capability, in accordance with some example embodiments.

FIG. 5A shows a flow chart of method steps for providing reminders in a device according to the device's capability, in accordance with some example embodiments. For the embodiment shown in FIG. 5A, the method 500A begins at step 510, where the user requests from a device a capability to be notified of. As an example, the capability to be notified of can be when high quality video call over cellular is available for the wireless device, or when voice and data services are available for the wireless device, or when any capability related to mobility is available for the wireless device. Then, at step 520, the device checks if the requested capability is available for the device. Next, at step 530, the device determines whether the requested capability is available. If the requested capability is not available, then the method returns to step 520, where the device continues to check if the requested capability is available for the device. If, however, the requested capability is available, then the method continues to step 540, where the device notifies the user that the requested capability is available.

Figure 5B:
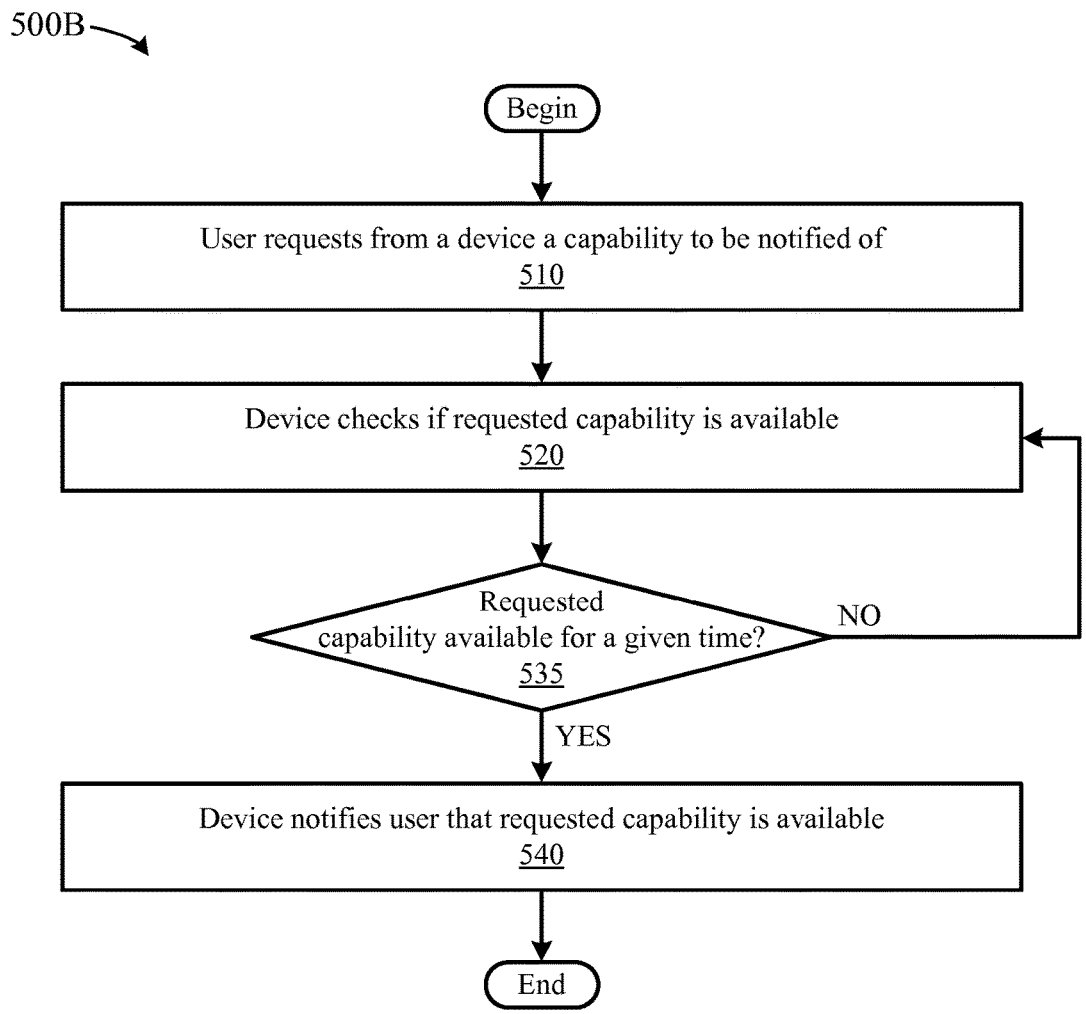
FIG. 5B shows a flow chart of method steps for providing reminders in a device according to the device's capability with a built-in hysteresis for detecting the capability, in accordance with some example embodiments.

FIG. 5B shows a flow chart of method steps for providing reminders in a device according to the device's capability with a built-in hysteresis, in accordance with some example embodiments. The embodiment shown in FIG. 5B addresses the issue that the determination performed in step 530 of FIG. 5A can be instantaneous. To avoid the possibility that the device can have rapid changes in the device's capability, step 530 of FIG. 5A is replaced with step 535 of FIG. 5B, where notification is sent to the user only after the requested capability of step 510 has been available for a given time. In one embodiment, the given time can be a single predetermined period of time for all types of capability changes. In one embodiment, the given time can be a different predetermined period of time for each type of capability changes, since some types of capability changes can require a longer or shorter stabilizing time. The inclusion of a given time for making the determination provides for a built-in hysteresis, so that the notification sent to the user represents a relatively stable capability of the device. Furthermore, only one notification is sent to the user reflecting the capability change (e.g., only one notification message of "reliable voice call service is now available for the primary device"), and not a stream of notifications all reflecting the same capability change (e.g., not a stream of "reliable voice call service is now available for the primary device" notification messages).

For steps 370 and 375 in FIG. 3, it should be noted that the wireless capability (or the cellular service) that the user has specified for notification in step 360 will dictate the Baseline conditions (i.e., registered Baseline indication in step 370) that will trigger the reminders/notification in step 375. In other words, each cellular service (i.e., each wireless capability specified for notification in step 360) can have its own metrics for the Baseline conditions. For example, the cellular service of voice call would have a Baseline metrics that includes factors such as the power condition and link quality, while the cellular service of data call would have a Baseline metrics that includes factors such as the Radio Bearer Rate and link quality. The data call metrics can further include other factors such as "is the device roaming", "does the device have an IP address", "how does the network schedule resources to the device", quality of service, etc. As such, each specific cellular service (i.e., each specific cellular capability) can be mapped to its own specific Baseline metrics. In one embodiment, the Cellular Control Software and the Reminder Application APIs are written such that they have this service to metrics mapping.

In one embodiment, the service to metrics mapping is stored with the Cellular Control Software, so this mapping is transparent to the Reminder Application (i.e., the Reminder Application does not know what metrics is mapped to a particular service). In this embodiment, the Reminder Application only knows the service that the user is requesting for a reminder, and the Reminder Application relies on the Cellular Control Software having the mapping between the requested service and the metrics. As such, the Cellular Control Software has a pre-defined set of metrics which is relevant for the requested service and, based on that mapping, the Cellular Control Software will register for those Baseband indications to be sent over to the modem processor. Then every time those Baseband conditions are met, the modem processor is going to send the IPC notification to the Cellular Control Software, as shown in step 375 of FIG. 3. After receiving the IPC notification, the Cellular Control Software has a computation/check mechanism to decide if the requested Baseband conditions are met, as shown in step 380 of FIG. 3. In one embodiment, the modem processor just sends the raw metrics (e.g., link quality is −93 dBm, Bearer rate is 384 Kbps), and it is the job of the Cellular Control Software to check if these raw metrics translate into a good voice quality. Therefore, there might be some computation and check mechanism involved with step 380 of FIG. 3. Step 380 of FIG. 3 can also include some hysteresis as previously described in FIG. 4B, where the Cellular Control Software is going to decide that the Baseband conditions are met only after these condition have been sustained for a given period of time, say 5 seconds. After deciding the Baseband conditions are met, the Cellular Control Software is going to send an IPC notification to the Reminder Application for triggering a reminder to the user.

The system shown in FIG. 3 and the methods shown in FIGS. 4A-4B and 5A-5B can send reminders to the user when a primary mobile device's cellular capabilities have changed, enabling the primary mobile device to provide certain desirable cellular capabilities, such as sufficient data throughput that can support video call over cellular with a proper quality of service. Therefore, the user no longer needs to be constantly trying to check the primary mobile device to monitor and test its wireless capability. This, in turn, can provide for a better user experience, and avoid unnecessary power consumption due to the user checking the device and keeping the display on.

In one embodiment, the reminders to the user can be an alert or some kind of notification on the primary device. For example, this can be a ping or something pops up. In another embodiment, the reminder can be a set up to make or dial a call for the user. In other word, the primary device can initiate the call instead of just posting a reminder. In other embodiments, the primary device can take some action, other than just posting some reminder. In some embodiments, since the user might not be using a primary device when the primary device is capable of making a reliable voice, the primary device can check if the user is on the primary device before initiating the voice call. The use of an alert or some kind of notification can make more sense in other scenarios, such as when a primary device is near or connected to another device which has a physical keyboard. However, in the physical keyboard scenario, instead of reminding the user, the nearby or connected device can automatically turn on the email application when the user has requested for reminder of a physical keyboard so that the user can directly use the physical keyboard to type a long email.

Therefore, in some embodiments, instead of a reminder, the primary device is configured to perform a designated action or any pre-determined action, when the capability conditions are met. In one embodiment, the designated action or the pre-determined action can be to initiate or perform the service or capability that the user desires and has requested the primary device to notified the user when the service or capability becomes available. In one example, this can be as simple as initiating a voice call when reliable voice call service becomes available on the primary device. In another example, this can be as simple as sending a photo when the primary device becomes connected to WiFi.

In one embodiment, a user, due to mobility, can move among different devices offering different capabilities that are within the user's own cloud. It should be possible to set up a reminder so that the user can be notified when the user is connected to or nearby another device that can offer the specific service or capability that the user desires. This reminder can be kept on a server and pushed to all devices within the cloud. Then one of these devices within the cloud can alert the user when that one device within the cloud can provide for the specific service or capability that the user desires. For example, the user can request to be reminded on a primary device when the primary device is connected to or near another device in the cloud that supports unlimited data usage. The user can input this reminder from the primary device or from any other device. The reminder can specify that the primary device be notified when the primary device is connected to or near any device that supports unlimited data usage. In one embodiment, this can also include the primary device itself becoming capable of supporting unlimited data usage.

Regarding a nearby device, it can be understood to be a second device that is physically near the primary device. It can also be understood either from the wireless peer-to-peer link that the primary device is near a second device or from the fact that a user can touch the second device. In other words, the nearby device does not need to be just some wireless sensing that the user and the primary device is near the second device. It can also be that the user is physically next to the second device so that the user can physically touch the second device.

In one embodiment, the "nearby" second device with the requested capabilities either detects an active usage or the second device detects that the user is near the device over WiFi or BT link. Or the second device detects that the user is near the device because the user physically touches or performs an action on the second device. Subsequently, notification is sent to the primary device notifying that the user is actually near a device which offers the requested capabilities.

Here are some example scenarios. In example scenario one, a tablet computer with a postpaid SIM (subscriber identification module) card is a nearby device that can remind a user that the user is now nearby a second device with unlimited data plan. In example scenario two, a primary device reminds a user that the user is connected to or nearby a device which supports a video call over cellular (such as Apples's FaceTime over cellular), because not all SIM cards may be registered for this service. This reminder is sent to the user through the primary device, so that the user does not forget to make this video call. In example scenario three, a primary device reminds a user that the user is connected to or nearby a physical keyboard. The user wants to type something long and touchscreen is inconvenient for typing, so remind the user when the user is near a portable computer with a physical keyboard. The method can understand that the user is near the portable computer with the physical keyboard either by communication (e.g., either WiFi or BT peer-to-peer) between the portable computer and the primary device, or by giving some user input into the portable computer (such as the user touching the physical keyboard or the user turning on the display).

Figure 6:
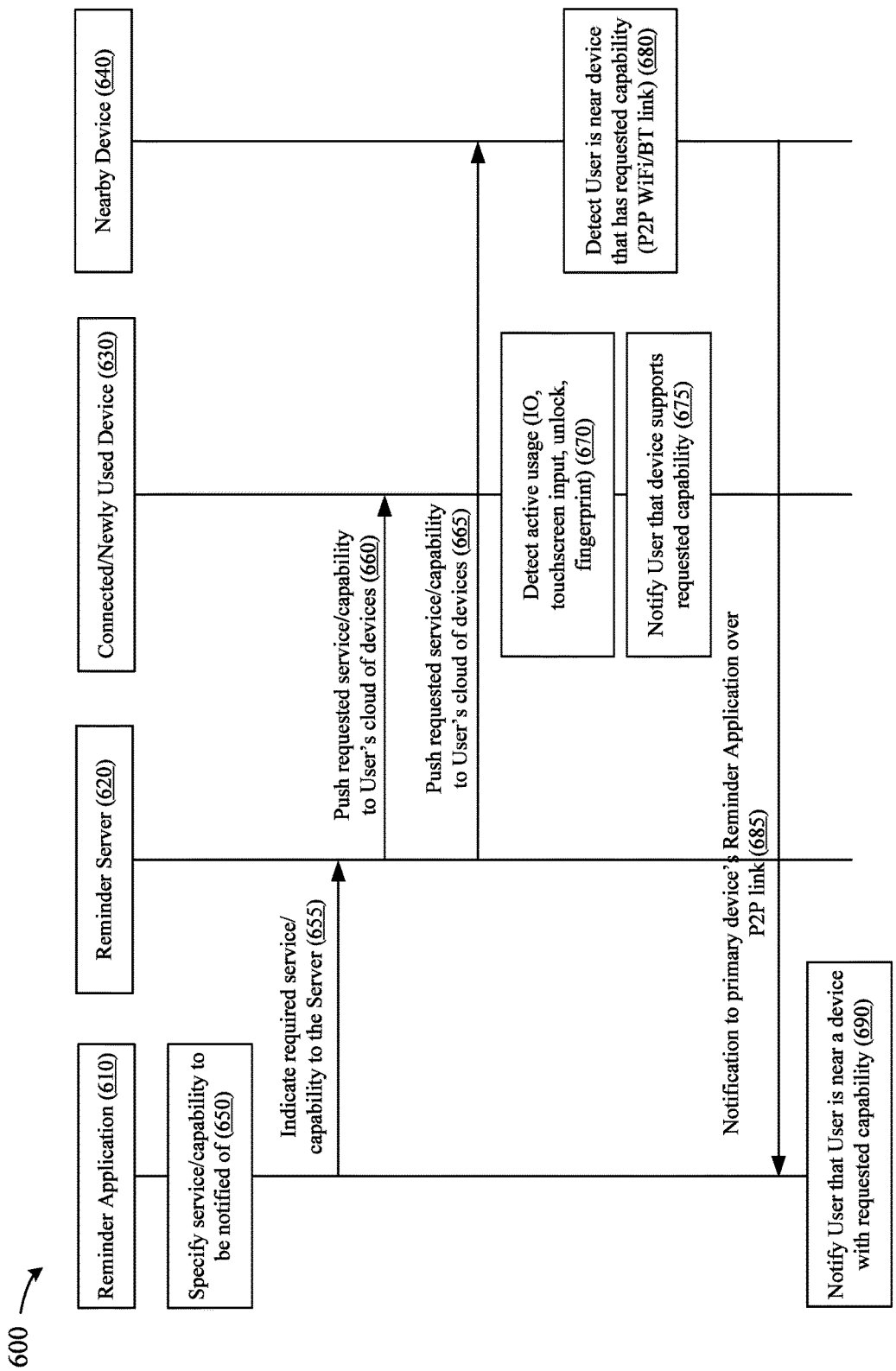
FIG. 6 shows a system for providing reminders according to a connected/nearby device's capability, in accordance with some example embodiments.

FIG. 6 shows a system 600 for providing reminders according to a connected/nearby device's capability, in accordance with some example embodiments. From one point of view, system 600 presents software architecture between reminder application 610, reminder server 620, connected or newly used device 630, and nearby device 640. In one embodiment, the reminder application 610 can be a software application running on a user's primary device. The reminder process is initiated, in step 650, by a user using the reminder application 610 to specify a service/capability that the user wishes to be notified of. For example, the user may wish to be reminded when the user is near a second device which has a physical keyboard, or when the user is near a second device which supports unlimited data usage, or when the user is near a second device which has a free data sharing plan (e.g., free WiFi). Then, in step 655, the reminder application 610 pushed this request for a service/capability to the reminder server 620. Next, in steps 660 and 665, the reminder server 620 further pushes this request for a service/capability to the user's cloud of devices, which can include a connected/newly used device 630 and a nearby device 640.

For the connected/newly used device 630, the next step 670 occurs when the connected/newly used device 630 detects active usage. In step 670, active usage can be detected through IO (input/output) input, touchscreen input, unlock, fingerprint, etc. After step 670, the connected/newly used device 630 proceeds to step 675, where the connected/newly used device 630 notifies the user that device 630 supports the requested service/capability. As an example, the user may wish to be reminded when the user is near a second device which has a physical keyboard. The user inputs this request for a physical keyboard using the user's smartphone. Then the user comes home and starts using the user's portable computer. Now the portable computer becomes the primary device and the portable computer realizes that there is a request for a physical keyboard. Since the portable computer has a physical keyboard, a reminder will pop up on the portable computer and notify the user that a physical keyboard is now available.

For the nearby device 640, the next step 680 occurs when the nearby device 640 detects that the user (or more precisely the primary device) is nearby through the peer-to-peer (P2P) WiFi or BT link. In step 685, the nearby device 640 sends a notification to the primary device's reminder application over the peer-to-peer link. Then, in step 690, the primary device can notify the user that the user is near a device (i.e., a nearby device) with the requested service/capability. As an example, the user may wish to be reminded when the user is near a second device which has a physical keyboard. The user inputs this request for a physical keyboard using the user's smartphone. Then the user enters the user's office and gets near to the user's portable computer. Now the portable computer detects that the primary device is nearby the portable computer through the peer-to-peer WiFi or BT link. Then the portable computer sends a notification to the smartphone's (i.e., primary device) reminder application over the peer-to-peer link. In response, the smartphone is going to pop up a reminder indicating the user (or more precisely the primary device) is near a device with a physical keyboard. Please note that, in this example, the user has not touched the portable computer, so it does not make sense to show the reminder notification on the portable computer (i.e., nearby device).

In the previous examples described, the second device can generally be characterized as a second device belonging to or associated with the user of the primary device. But, in one embodiment, the second device can also belong to or be associated with a second user different from the user of the primary device. Furthermore, this second device can be providing free data or WiFi or any other service/capability that the user is interested in. In that embodiment, the user of primary device can specify a reminder for any service/capability that the user is interested in. Then, a notification can be sent to the user through the primary device for any nearby device, including those belonging to a third party not associated with the user, which can provide the service/capability that the user is interested in.

In the previous examples described, the second device (i.e., connected or newly used device and nearby device) can generally be characterized as being within the user's own cloud. In one embodiment, the second device (i.e., connected or newly used device and nearby device) can also be a device outside the user's own cloud. In one embodiment, the second device can be any device that supports the reminder application API. In one embodiment, the second device can be any device that supports a UI (user interface) that is associated with or looks at a service/capability. In one embodiment, the second device can be any device that is willing to broadcast its service or capability. For example, the second device can be a device broadcasting that it is a printer or it can do blood pressure monitoring. The user can initiate the process by setting the primary device to remind the user when a second device with such a service/capability is available. Then, when the primary device is near such a second device, the primary device can remind the user that such a second device is now available.

Figure 7:
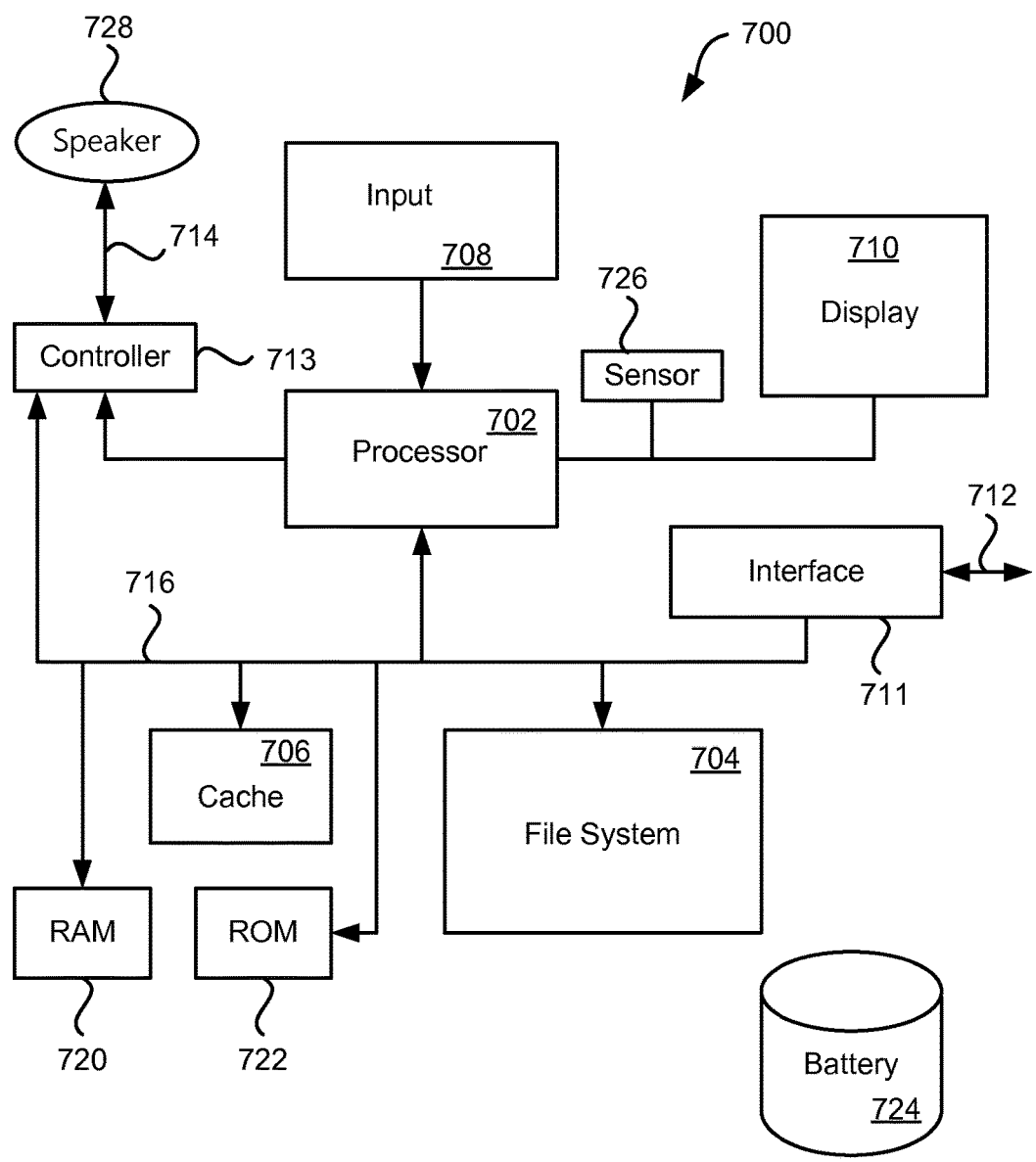
FIG. 7 shows a block diagram of an electronic device suitable for use with the described embodiments.

FIG. 7 is a block diagram of an electronic device suitable for controlling some of the processes in the described embodiment. Electronic device 700 can illustrate circuitry of a representative computing device. Electronic device 700 can include a processor 702 that pertains to a microprocessor or controller for controlling the overall operation of electronic device 700. Electronic device 700 can include instruction data pertaining to operating instructions, such as instructions for implementing and controlling a user equipment, in a file system 704 and a cache 706. File system 704 can be a storage disk or a plurality of disks. In some embodiments, file system 704 can be flash memory, semiconductor (solid state) memory or the like. The file system 704 can typically provide high capacity storage capability for the electronic device 700. However, since the access time for the file system 704 can be relatively slow (especially if file system 704 includes a mechanical disk drive), the electronic device 700 can also include cache 706. The cache 706 can include, for example, Random-Access Memory (RAM) provided by semiconductor memory. The relative access time to the cache 706 can be substantially shorter than for the file system 704. However, cache 706 may not have the large storage capacity of file system 704. Further, file system 704, when active, can consume more power than cache 706. Power consumption often can be a concern when the electronic device 700 is a portable device that is powered by battery 724. The electronic device 700 can also include a RAM 720 and a Read-Only Memory (ROM) 722. The ROM 722 can store programs, utilities or processes to be executed in a non-volatile manner. The RAM 720 can provide volatile data storage, such as for cache 706.

Electronic device 700 can also include user input device 708 that allows a user of the electronic device 700 to interact with the electronic device 700. For example, user input device 708 can take a variety of forms, such as a button, keypad, dial, touch screen, audio input interface, visual/image capture input interface, input in the form of sensor data, etc. Still further, electronic device 700 can include a display 710 (screen display) that can be controlled by processor 702 to display information, such as web pages, to the user. Data bus 716 can facilitate data transfer between at least file system 704, cache 706, processor 702, and input/output (I/O) controller 713. I/O controller 713 can be used to interface with and control different devices such as speakers, ear buds, microphone or video cameras through appropriate codecs. For example, control bus 714 can be used to control speaker 728.

Electronic device 700 can also include a network/bus interface 711 that couples to data link 712. Data link 712 can allow electronic device 700 to couple to a host computer or to accessory devices or to other networks such as the internet. The data link 712 can be provided over a wired connection or a wireless connection. In the case of a wireless connection, network/bus interface 711 can include a wireless transceiver, such as a wireless transceiver configured to transmit and receive data according to the LTE (Long Term Evolution) protocol. Sensor 726 can take the form of circuitry for detecting any number of stimuli. For example, sensor 726 can include any number of sensors for monitoring environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, HDDs (hard disk drives), SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A computing device configured to display notifications, the computing device comprising:
   at least one processor; and
   at least one memory storing instructions that, when executed by the at least one processor, cause the computing device to:
   receive a first request to perform a function of a plurality of functions associated with a second computing device, wherein each function of the plurality of functions is associated with a respective stabilization threshold that indicates the second computing device is to remain capable of performing the function for a respective time delay prior to indicating that the function is available to be performed;
   issue a second request to cause a notification to be issued to both the computing device and the second computing device in response to the second computing device being (i) in proximity to the computing device and/or (ii) actively utilized;
   receive the notification; and
   in response to identifying that the respective stabilization threshold associated with the function is satisfied:
   display, at the computing device, an indication associated with the notification.

2. The computing device of claim 1, wherein a server computing device is configured to:
   receive the second request from the computing device, and
   provide the second request to the second computing device.

3. The computing device of claim 2, wherein the computing device and the second computing device are members of a user account known to a cloud service managed by the server computing device.

4. The computing device of claim 1, further comprising, in response to receiving the notification:
   automatically launching an application associated with the function.

5. The computing device of claim 4, wherein the second computing device is configured to detect a physical touch that comprises one or more of:
   a fingerprint input; or
   a touchscreen input.

6. The computing device of claim 1, wherein the notification is received when:
   a WiFi link enables the computing device and the second computing device to communicate with one another; or
   a Bluetooth link enables the computing device and the second computing device to communicate with one another.

7. The computing device of claim 1, wherein the second request is associated with at least one of the following functionalities that are available to the second computing device:
   a physical keyboard;
   a printer; or
   unlimited data usage.

8. A method for displaying notifications, the method comprising:
   at a computing device configured to carry out steps that include:
   receiving a first request to perform a function of a plurality of functions associated with a second computing device, wherein each function of the plurality of functions is associated with a respective stabilization threshold that indicates the second computing device is to remain capable of performing the function for a respective time delay prior to indicating that the function is available to be performed;
   issuing a second request to cause a notification to be issued to both the computing device and the second computing device in response to the second computing device being (i) in proximity to the computing device and/or (ii) actively utilized;
   receiving the notification; and
   in response to identifying that the respective stabilization threshold associated with the function is satisfied:
   displaying, at the computing device, an indication associated with the notification.

9. The method of claim 8, wherein the second request is issued to a server computing device, and the server computing device is configured to provide the second request to the second computing device.

10. The method of claim 9, wherein the computing device and the second computing device are members of a user account known to a cloud service managed by the server computing device.

11. The method of claim 8, further comprising, in response to receiving the notification:
   automatically launching an application associated with the function.

12. The method of claim 11, wherein the second computing device is configured to detect a physical touch that comprises one or more of:
   a fingerprint input; or
   a touchscreen input.

13. The method of claim 8, wherein the notification is received when:
   a WiFi link enables the computing device and the second computing device to communicate with one another; or
   a Bluetooth link enables the computing device and the second computing device to communicate with one another.

14. The method of claim 8, wherein the second request is associated with at least one of the following functionalities that are available to the second computing device:
   a physical keyboard;
   a printer; or
   unlimited data usage.

15. At least one non-transitory computer readable storage medium configured to store instructions that, when executed by at least one processor included in a computing device, cause notifications to be displayed at the computing device, by carrying out steps that include:
   receiving a first request to perform a function of a plurality of functions associated with a second computing device, wherein each function of the plurality of functions is associated with a respective stabilization threshold that indicates the second computing device is to remain capable of performing the function for a respective time delay prior to indicating that the function is available to be performed;
   issuing a second request to cause a notification to be issued to both the computing device and the second computing device in response to the second computing device being (i) in proximity to the computing device and/or (ii) actively utilized;
   receiving the notification; and
   in response to identifying that the respective stabilization threshold associated with the function is satisfied:
      displaying, at the computing device, an indication associated with the notification.

16. The at least one non-transitory computer readable storage medium of claim 15, wherein the second request is issued to a server computing device, and the server computing device is configured to provide the second request to the second computing device.

17. The at least one non-transitory computer readable storage medium of claim 16, wherein the computing device and the second computing device are members of a user account known to a cloud service managed by the server computing device.

18. The at least one non-transitory computer readable storage medium of claim 15, wherein the steps further include, in response to receiving the notification:
   automatically launching an application associated with the function.

19. The at least one non-transitory computer readable storage medium of claim 15, wherein the notification is received when:
   a WiFi link enables the computing device and the second computing device to communicate with one another; or
   a Bluetooth link enables the computing device and the second computing device to communicate with one another.

20. The at least one non-transitory computer readable storage medium of claim 15, wherein the second request is associated with at least one of the following functionalities that are available to the second computing device:
   a physical keyboard;
   a printer; or
   unlimited data usage.

* * * * *